(12) United States Patent
Kuroda et al.

(10) Patent No.: US 11,948,105 B2
(45) Date of Patent: Apr. 2, 2024

(54) IDENTIFICATION INFORMATION INPUT SUPPORT SYSTEM

(71) Applicant: DAIKIN INDUSTRIES, LTD., Osaka (JP)

(72) Inventors: Yuuko Kuroda, Osaka (JP); Kenichi Nagahara, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 14 days.

(21) Appl. No.: 17/277,276

(22) PCT Filed: Sep. 30, 2019

(86) PCT No.: PCT/JP2019/038635
§ 371 (c)(1),
(2) Date: Mar. 17, 2021

(87) PCT Pub. No.: WO2020/071338
PCT Pub. Date: Apr. 9, 2020

(65) Prior Publication Data
US 2021/0312373 A1    Oct. 7, 2021

(30) Foreign Application Priority Data

Oct. 4, 2018   (JP) ................................. 2018-189568

(51) Int. Cl.
*G06Q 10/00* (2023.01)
*F24F 11/30* (2018.01)
(Continued)

(52) U.S. Cl.
CPC ...... *G06Q 10/063114* (2013.01); *F24F 11/30* (2018.01); *F24F 11/58* (2018.01); *G06Q 10/063112* (2013.01)

(58) Field of Classification Search
None
See application file for complete search history.

(56) References Cited

U.S. PATENT DOCUMENTS

| | | | |
|---|---|---|---|
| 7,089,530 B1 * | 8/2006 | Dardinski | G05B 19/41845 717/105 |
| 2003/0050871 A1 * | 3/2003 | Broughton | G06Q 10/087 705/28 |

(Continued)

FOREIGN PATENT DOCUMENTS

| | | |
|---|---|---|
| JP | 2003-139376 A | 5/2003 |
| JP | 2007-164542 A | 6/2007 |

(Continued)

OTHER PUBLICATIONS

"Wireless sensor networks as part of a web-based building environmental monitoring system" WS Jang, WM Healy, MJ Skibniewski—Automation in Construction, 2008—Elsevier (Year: 2008).*

(Continued)

*Primary Examiner* — Rutao Wu
*Assistant Examiner* — Scott M Ross
(74) *Attorney, Agent, or Firm* — Global IP Counselors, LLP (57) ABSTRACT

An identification information input support system supports a worker inputting identification information to a plurality of devices. The support system includes an information storage apparatus, and a mobile terminal. The information storage apparatus includes a communication unit that communicates with the mobile terminal, a storage unit that stores device information, and an update unit that updates the management information in response to input of the identification information. The device information includes the identification information, drawing information indicating location in which the device is installed, layout information indicating a layout of the device in the drawing information, and management information indicating a degree of progress of the task of inputting the identification information to the devices. The mobile terminal includes a communication unit that communicates with the information storage apparatus, (Continued)

and a display unit that displays the device information, the drawing information, and the layout information in association with each other.

11 Claims, 6 Drawing Sheets

(51) Int. Cl.
*F24F 11/58* (2018.01)
*G06Q 10/0631* (2023.01)

(56) References Cited

U.S. PATENT DOCUMENTS

| | | | |
|---|---|---|---|
| 2008/0316206 A1* | 12/2008 | Jaynes | G06T 19/00 345/420 |
| 2015/0108211 A1* | 4/2015 | Higgins | G06K 5/00 235/375 |
| 2015/0142176 A1 | 5/2015 | Senba | |
| 2015/0185725 A1 | 7/2015 | Sasaki et al. | |
| 2015/0201167 A1 | 7/2015 | Yamaji et al. | |
| 2016/0370787 A1* | 12/2016 | Hashimoto | G05B 19/4183 |
| 2017/0103290 A1* | 4/2017 | Guionneau | G06Q 10/08 |
| 2018/0322376 A1* | 11/2018 | Henry | G07F 9/001 |
| 2019/0073827 A1* | 3/2019 | Coronado | H04Q 9/00 |
| 2020/0145920 A1* | 5/2020 | Shen | H04W 4/023 |
| 2020/0336707 A1* | 10/2020 | Schmirler | H04N 7/181 |
| 2022/0044449 A1* | 2/2022 | Chhabra | G06T 11/00 |

FOREIGN PATENT DOCUMENTS

| | | |
|---|---|---|
| JP | 2009-3788 A | 1/2009 |
| JP | 2009-300060 A | 12/2009 |
| JP | 2010-7887 A | 1/2010 |
| JP | 2014-16062 A | 1/2014 |
| JP | 2015-60555 A | 3/2015 |
| JP | 2017-10200 A | 1/2017 |
| JP | 2018-21754 A | 2/2018 |
| JP | 2018-44735 A | 3/2018 |
| WO | 2014/006884 A1 | 1/2014 |

OTHER PUBLICATIONS

"An emerging technology for improved building automation control" W Guo, M Zhou—2009 IEEE International Conference on . . . , 2009—ieeexplore.ieee.org (Year: 2009).*
"Invisible machine-readable labels that identify and track objects", MIT EECS, News & Events, by Steve Nadis, Jan. 31, 2022 (Year: 2022).*
Internet of Things & 5G, NFC Direct, 2022, https://www.nfcdirect.co.uk/nfc-information/internet-of-things-5g.htm (Year: 2022).*
How AR & VR are transforming building design and construction, Aug. 17, 2020, https://spot.ul.com/blog/how-ar-vr-are-transforming-building-design-and-construction/ (Year: 2020).*
Augmented Reality in Construction: A Game Changer for the Industry? Dec. 19, 2022 https://blog.thirdeyegen.com/augmented-reality-in-construction-a-game-changer-for-the-industry (Year: 2022).*
International Search Report of corresponding PCT Application No. PCT/JP2019/038635 dated Nov. 5, 2019.
International Preliminary Report of corresponding PCT Application No. PCT/JP2019/038635 dated Apr. 15, 2021.
European Search Report of corresponding EP Application No. 19 86 8810.3 dated Jun. 28, 2021.

* cited by examiner

IDENTIFICATION INFORMATION INPUT SUPPORT SYSTEM

CROSS-REFERENCE TO RELATED APPLICATIONS

This U.S. National stage application claims priority under 35 U.S.C. § 119(a) to Japanese Patent Application No. 2018-189568, filed in Japan on Oct. 4, 2018, the entire contents of which are hereby incorporated herein by reference.

BACKGROUND

Field of the Invention

The present disclosure relates to an identification information input support system.

Background Information

There is a management apparatus for managing a plurality of equipment devices, as disclosed in Japanese Unexamined Patent Application Publication No. 2009-300060.

SUMMARY

To manage a plurality of equipment devices, it is necessary to set a unique address to each of the equipment devices after the equipment devices have been installed. Hitherto, address setting has been performed by a worker with reference to a paper drawing.

An identification information input support system according to a first aspect supports a worker in performing a task of inputting identification information to a plurality of devices. The identification information input support system includes an information storage apparatus and a mobile terminal. The information storage apparatus stores device information, drawing information, and layout information. The device information is information including the identification information to be input. The drawing information is information indicating locations in which the device is installed. The layout information is information indicating a layout of the device in the drawing information. The mobile terminal includes a communication unit and a display unit. The communication unit communicates with the information storage apparatus. The display unit displays the device information, the drawing information, and the layout information in association with each other.

The device information, the drawing information, and the layout information are displayed on the display unit of the mobile terminal in association with each other. Accordingly, the worker is able to efficiently perform the task of inputting the identification information to the plurality of devices.

An identification information input support system according to a second aspect is the identification information input support system according to the first aspect, in which the information storage apparatus further stores management information. The management information is information indicating a degree of progress of the task of inputting the identification information to the devices. The display unit further displays the management information.

As a result of displaying the management information by the display unit, the worker is able to easily grasp the degree of progress of the task.

An identification information input support system according to a third aspect is the identification information input support system according to the second aspect, in which the communication unit communicates with the information storage apparatus in response to update of the degree of progress of the task. The information storage apparatus updates the management information in response to update of the degree of progress of the task.

Accordingly, the worker is able to easily grasp the updated degree of progress of the task.

An identification information input support system according to a fourth aspect supports a worker in performing a task of inputting identification information to a plurality of devices. The identification information input support system includes a storage unit and a display unit. The storage unit stores device information, drawing information, and layout information. The device information is information including the identification information to be input. The drawing information is information indicating a location in which the device is installed. The layout information is information indicating a layout of the devices in the drawing information. The display unit displays the device information, the drawing information, and the layout information in association with each other.

The device information, the drawing information, and the layout information are displayed on the display unit in association with each other. Accordingly, the worker is able to efficiently perform the task of inputting the identification information to the plurality of devices.

An identification information input support system according to a fifth aspect is the identification information input support system according to the fourth aspect, in which the storage unit further stores management information. The management information is information indicating a degree of progress of the task of inputting the identification information to the devices. The display unit further displays the management information.

As a result of displaying the management information by the display unit, the worker is able to easily grasp the degree of progress of the task.

An identification information input support system according to a sixth aspect is the identification information input support system according to any one of the first to fifth aspects, in which the identification information is information including addresses for managing the devices.

An identification information input support system according to a seventh aspect is the identification information input support system according to any one of the first to sixth aspects, in which the display unit displays the plurality of devices. The display unit highlights a piece of the identification information to be input to one device selected by the worker, or displays only the piece of the identification information to be input to the one device selected by the worker.

Accordingly, the worker is able to easily grasp the piece of the identification information to be input to the one device.

An identification information input support system according to an eighth aspect is the identification information input support system according to any one of the first to third aspects, in which the identification information input support system further includes a device status acquiring unit. The device status acquiring unit performs near field communication with the devices and acquires, from the devices, information about whether or not input of the identification information has been completed. The display unit further displays the information acquired by the device status acquiring unit.

The worker performs near field communication with the devices, thereby being able to easily grasp information about whether or not the task of inputting the identification information has been completed.

An identification information input support system according to a ninth aspect is the identification information input support system according to any one of the fourth to fifth aspects, in which the identification information input support system further includes a device status acquiring unit. The device status acquiring unit performs near field communication with the devices and acquires, from the devices, information about whether or not input of the identification information has been completed. The display unit further displays the information acquired by the device status acquiring unit.

The worker performs near field communication with the devices, thereby being able to easily grasp information about whether or not the task of inputting the identification information has been completed.

DETAILED DESCRIPTION OF EMBODIMENT(S)

An identification information input support system supports a worker in performing a task of inputting identification information to a plurality of devices.

In the present disclosure, the devices include an indoor unit of an air conditioning apparatus and a ventilation device. The air conditioning apparatus is an apparatus that achieves air conditioning, such as cooling or heating, in an internal target space of a house, a building, a factory, a public facility, or the like. In particular, the air conditioning apparatus is assumed to be applied to a facility having a large or a plurality of target spaces requiring a plurality of indoor units.

The air conditioning apparatus includes a refrigerant circuit in which an indoor unit and an outdoor unit are connected to each other via a connection pipe. The air conditioning apparatus performs a vapor-compression refrigeration cycle by causing refrigerant to circulate in the refrigerant circuit, thereby cooling or heating a target space.

The ventilation device ventilates a target space to decrease the carbon dioxide concentration of the target space.

The devices, which include the indoor unit and the ventilation device, have identification information assigned thereto, and the identification information is input by a worker at the time of installation or maintenance of the devices. The identification information includes a unique communication address that is set to each device.

Hereinafter, the identification information input support system will be described.

(1) (First Embodiment)

(1-1) Overall Configuration

Figure 1:
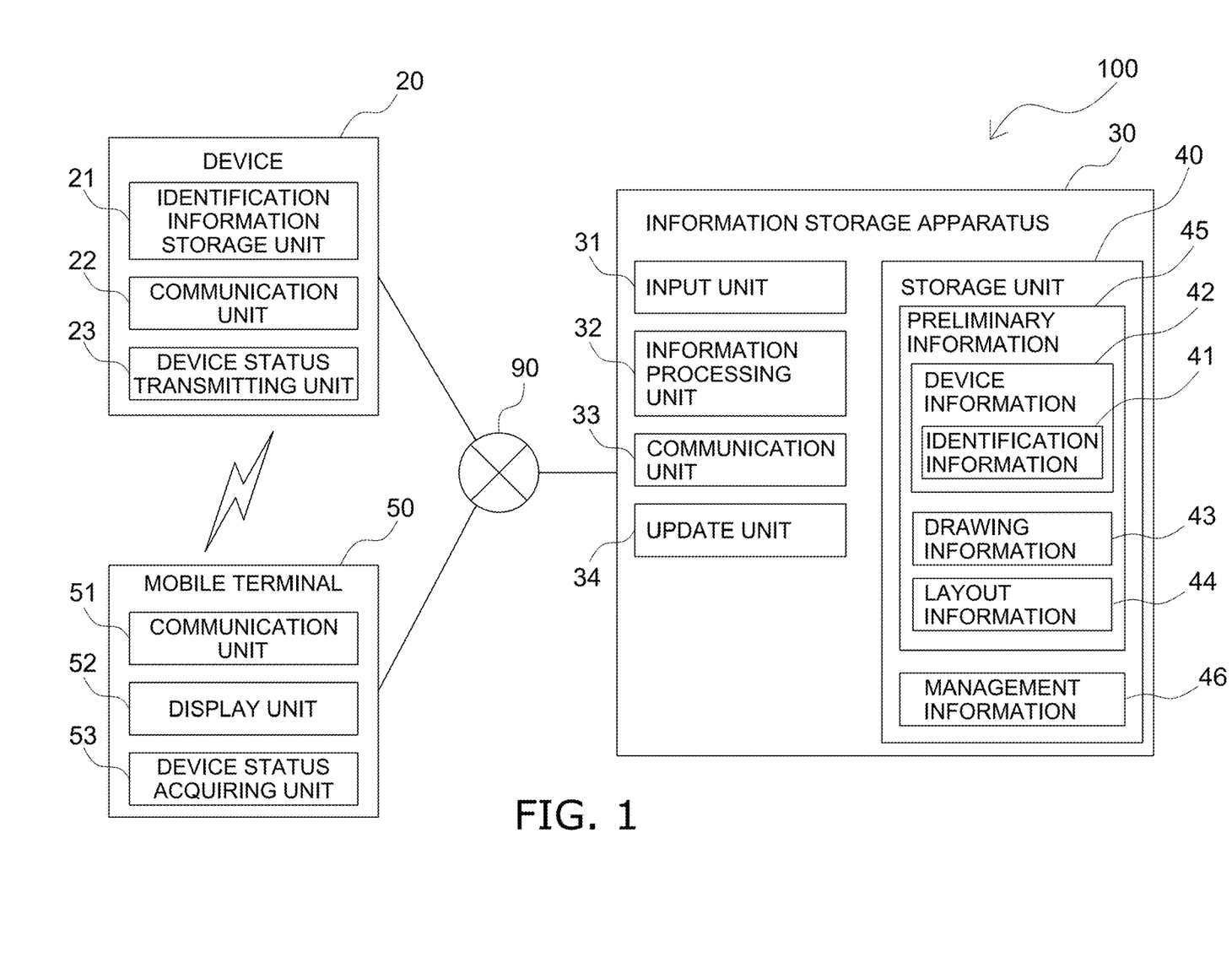
FIG. 1 is a block diagram illustrating the configuration of an identification information input support system according to a first embodiment.

FIG. 1 is a block diagram illustrating the configuration of an identification information input support system 100. The identification information input support system 100 mainly includes a device 20, an information storage apparatus 30, and a mobile terminal 50.

(1-2) Detailed Configuration (1-2-1) Device

The device 20 is an indoor unit of an air conditioning apparatus, or a ventilation device. A plurality of the devices 20 are installed in a target space in which a worker performs a task. Each device 20 includes an identification information storage unit 21, a communication unit 22, and a device status transmitting unit 23.

The identification information storage unit 21 stores identification information 41 input by the worker.

The communication unit 22 is connected to a communication link 90, such as the Internet, and is capable of communicating with the information storage apparatus 30, which will be described below. Note that, at the time point of a task of inputting identification information performed by the worker, which will be described below, the communication unit 22 is not connected to the communication link 90 in many cases.

The device status transmitting unit 23 performs near field wireless communication with the mobile terminal 50, which will be described below, and transmits information indicating whether or not input of the identification information 21 has been completed. The near field wireless communication is a communication scheme that enables two-way communication within a short distance of about several centimeters to about 10 meters. As a result of performing near field wireless communication, the device status transmitting unit 23 of the device 20 is capable of acquiring, from the mobile terminal 50 within a short distance, information indicating whether or not a task of inputting the identification information 41 has been completed.

(1-2-2) Information Storage Apparatus

The information storage apparatus 30 is, for example, a computer including a processor, such as a central processing unit (CPU) or a graphics processing unit (GPU), and performs predetermined computation processing or information read/write processing in accordance with a program. The information storage apparatus 30 includes an input unit 31, a storage unit 40, an information processing unit 32, a communication unit 33, and an update unit 34. The information processing unit 32 and the update unit 34 are functional processing units implemented by the processor.

The input unit 31 is for inputting device information 42 of the plurality of devices 20, drawing information 43, and layout information 44 of the plurality of devices 20. The device information 42 is information including the identification information 41 of the devices 20. The device information 42 further includes information indicating the zones to which the respective devices 20 belong on the drawing, the names of the devices 20, the model names of the devices 20, the characteristics of the devices 20, and the like. The drawing information 43 is information of the drawing illustrating the locations in which the respective devices 20 are installed. The layout information 44 is information indicating the layout of the devices 20 in the drawing information 43.

The device information 42, the drawing information 43, and the layout information 44 that have been input by the input unit 31 are processed by the information processing unit 32 and are associated with each other. Specifically, the individual devices 20 are arranged as icons at appropriate positions on the drawing. The icons are associated with the respective pieces of the device information 42 of the devices 20 corresponding to the icons. The information processed by the information processing unit 32 is regarded as preliminary information 45.

The storage unit 40 stores the preliminary information and management information 46. The management information 46 is information indicating the degree of progress of a task performed by the worker. The degree of progress indicates how much the task of inputting the identification information 41 has been or has not been completed. The management information 46 is updated as appropriate by the update unit 34, which will be described below, when the task performed by the worker proceeds.

The communication unit 33 is connected to the communication link 90, such as the Internet, and is capable of communicating with the devices 20 and the mobile terminal which will be described below.

The update unit 34 updates the management information 46 stored in the storage unit 40 when the task performed by the worker proceeds.

(1-2-3) Mobile Terminal

The mobile terminal 50 is, for example, a smartphone or a tablet personal computer (PC). The worker performs a task in a target space while carrying the mobile terminal 50. The mobile terminal 50 includes a communication unit 51, a display unit 52, and a device status transmitting unit 23.

The communication unit 51 is connected to the communication link 90, such as the Internet, and is capable of communicating with the information storage apparatus 30.

The display unit 52 displays the preliminary information 45 and the management information 46 in association with each other.

The device status transmitting unit 23 performs near field wireless communication with the device status transmitting unit 23 of the device 20, and receives information indicating whether or not input of the identification information 41 has been completed.

(1-3) Procedure of Task

Figure 2:
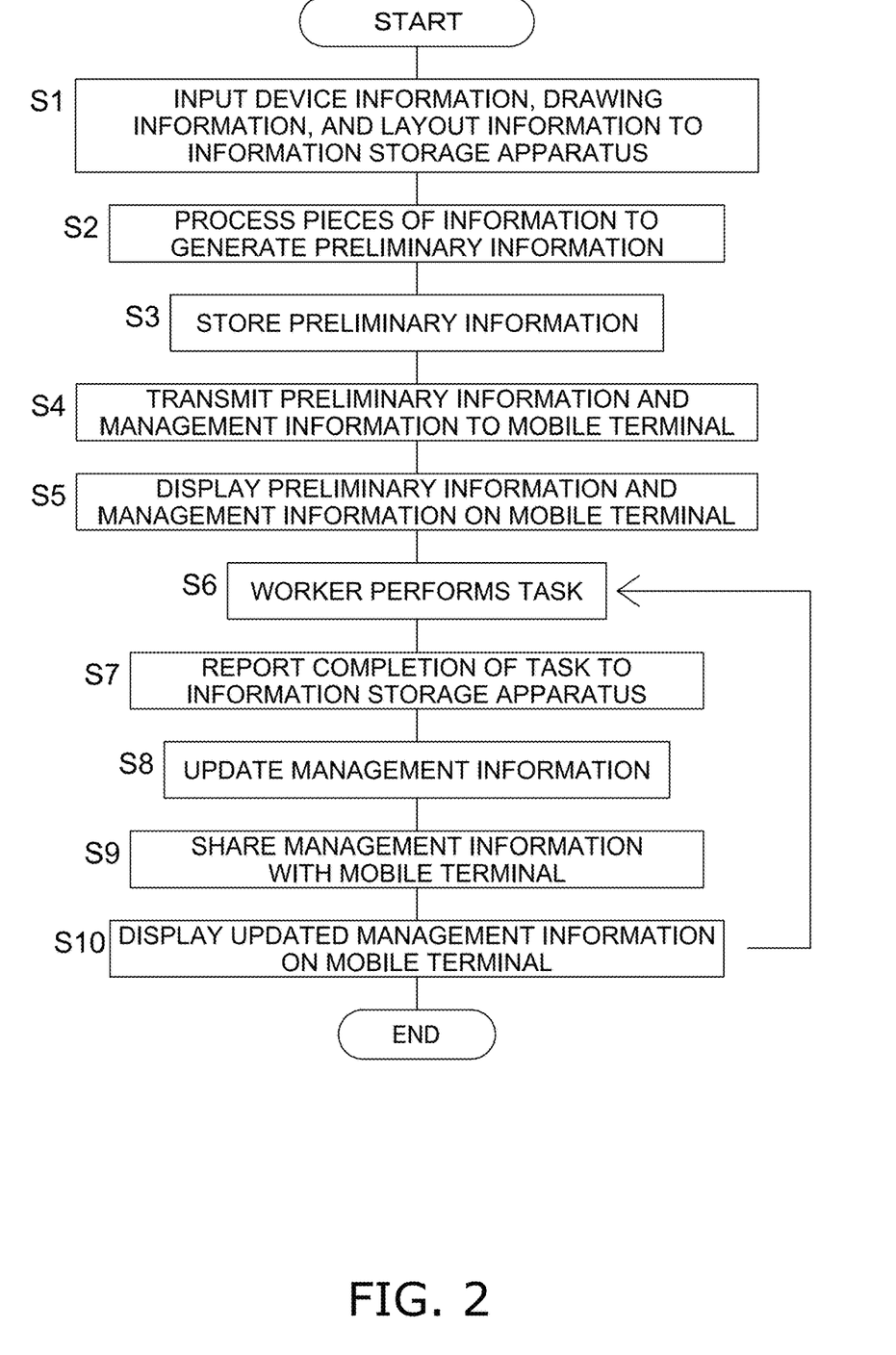
FIG. 2 is a flowchart illustrating the procedure of a task according to the first embodiment.

FIG. 2 is a flowchart illustrating the procedure of a task performed by the identification information input support system 100 and a worker. The identification information input support system 100 and the worker perform the task in accordance with the procedure including steps S1 to S9 in FIG. 2. The procedure of the task can be changed as appropriate.

Figure 3:
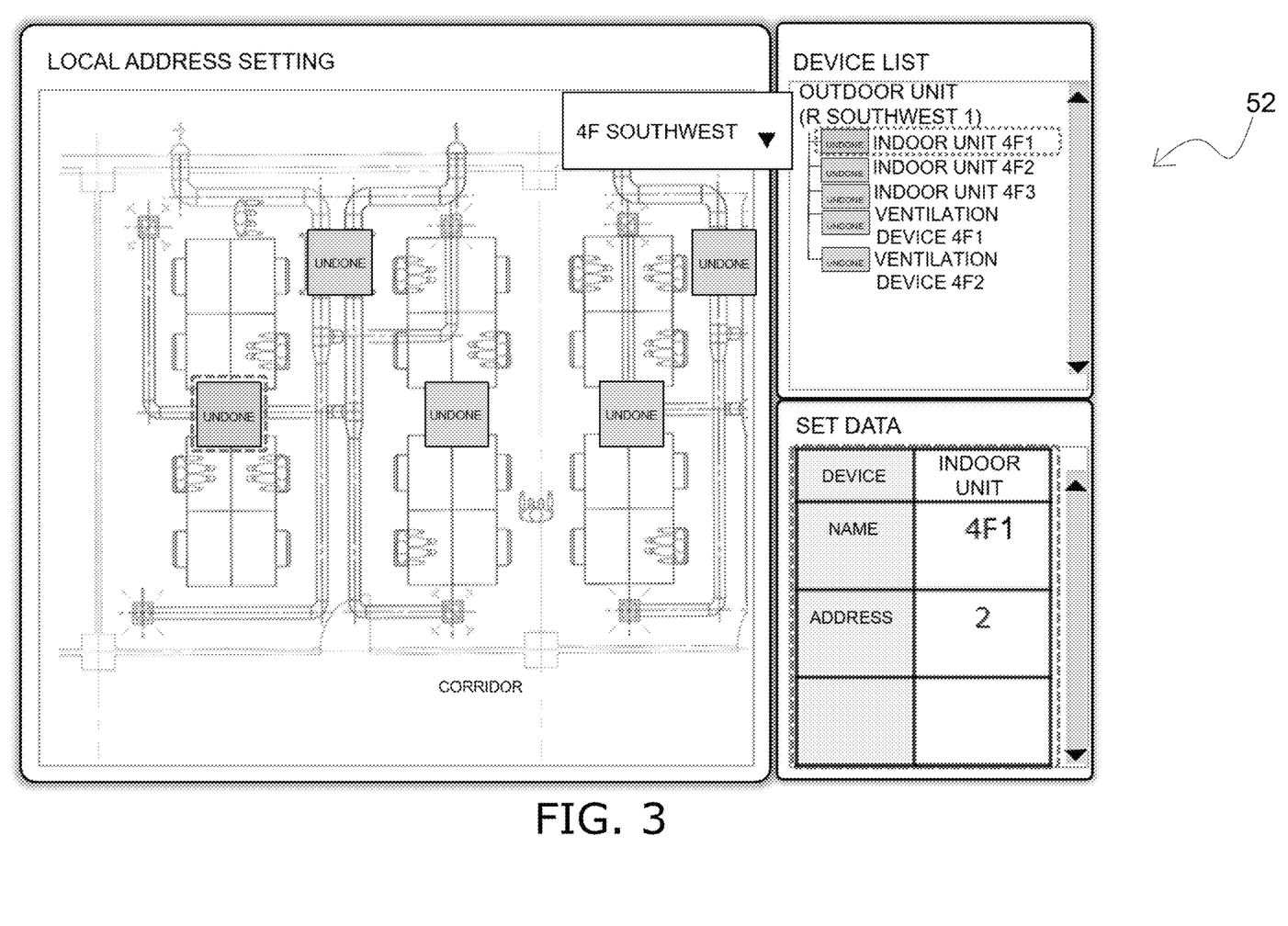
FIG. 3 illustrates an example of a screen of a display unit.
Figure 4:
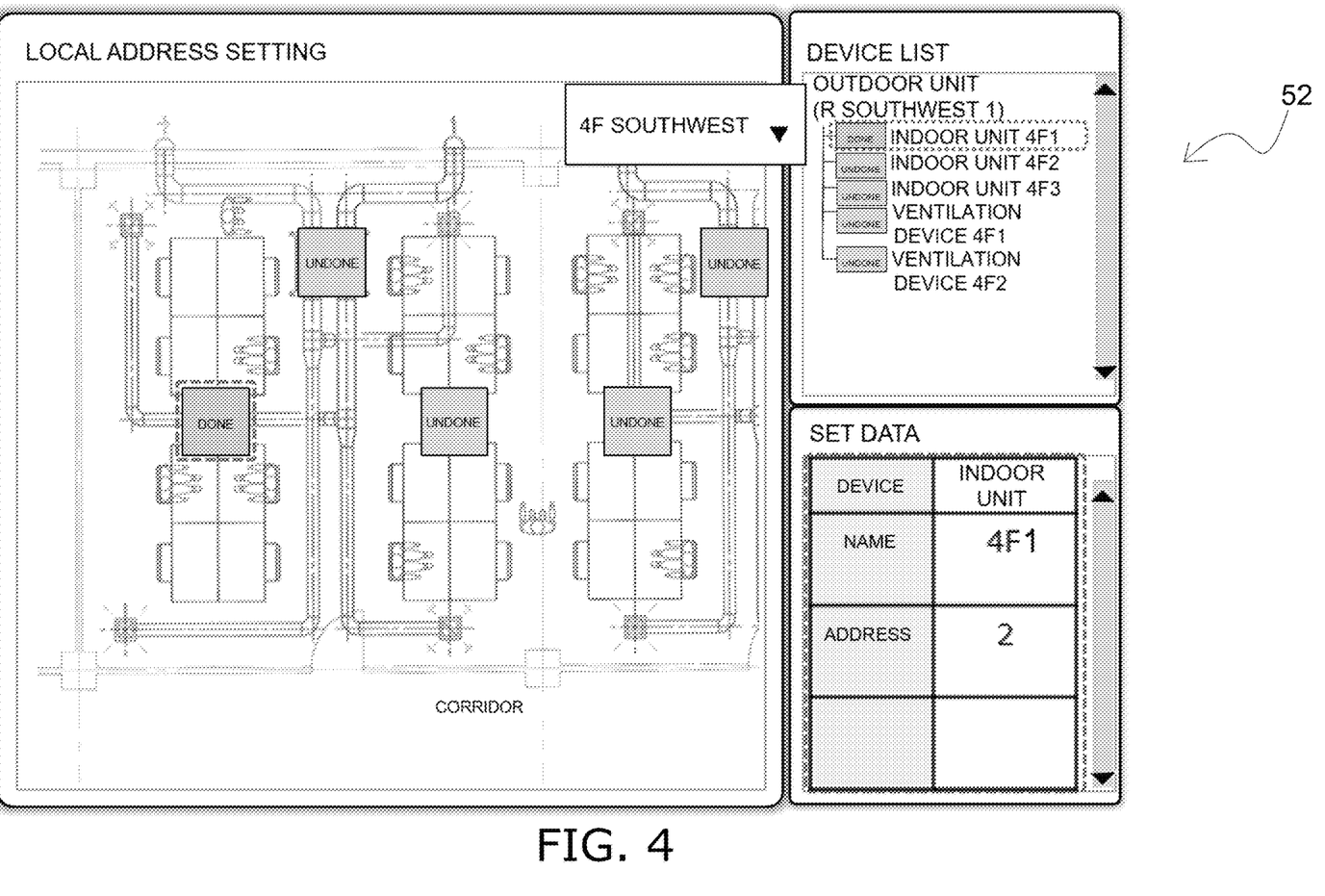
FIG. 4 illustrates an example of a screen of the display unit.

First, in step S1, the worker inputs the device information 42, the drawing information 43, and the layout information 44 by using the input unit 31 of the information storage apparatus 30. The individual pieces of input information are processed by the information processing unit 32 in step S2. The processed pieces of information are associated with each other and become the preliminary information 45. In step S3, the processed preliminary information 45 is stored in the storage unit 40. The preliminary information 45 stored in step S3 and the management information 46 stored in the storage unit 40 are transmitted from the communication unit 33 of the information storage apparatus 30 through the communication link 90 to the communication unit 51 of the mobile terminal 50 (step S4). In step S5, the mobile terminal 50 displays, on the display unit 52, the preliminary information 45 and the management information 46 that have been received by the communication unit 51. The display unit 52 displays the preliminary information 45 and the management information 46 in association with each other in the manner illustrated in FIG. 3, for example. In step S6, the worker performs a task of inputting the identification information 41 while referring the display unit 52. At this time, the worker is able to select one icon from among a plurality of icons (devices 20) displayed on the display unit 52. The display unit 52 displays only the piece of the device information 42 corresponding to the selected icon, as illustrated in FIG. 3. In step S7, in response to input of the identification information 41, the device 20 transmits information indicating that the task has been completed, from the communication unit 22 of the device 20 to the communication unit 33 of the information storage apparatus 30. In step S8, in response to receipt by the communication unit 33 of the information storage apparatus 30 of the information indicating that the task has been completed, the update unit 34 updates the management information 46 stored in the storage unit 40. In step S9, the updated management information 46 is shared with the mobile terminal 50 via the transmitting unit. In step S10, the mobile terminal 50 displays the updated management information 46 on the display unit 52. The updated management information 46 is displayed in the manner illustrated in FIG. 4, for example.

Step S105 to step S109 are repeatedly executed until the task for all the devices 20 arranged in the target space has been completed.

In a case where the communication unit 22 of the device 20 is not connected to the communication link 9090 at the time point of the above-described task, for example, update of the management information 46 in step S8 is performed on the basis of the information indicating the completion of the task and transmitted to the information storage apparatus 30 from the device 20 via the mobile terminal 50.

(1-4) Features 1-4-1

The identification information input support system 100 according to the present embodiment includes the devices 20, the information storage apparatus 30, and the mobile terminal 50. The information storage apparatus 30 includes the storage unit 40, and the storage unit 40 stores the preliminary information 45. The preliminary information 45 includes the device information 42, the drawing information 43, and the layout information 44 that have been processed by the information processing unit 32. The device information 42 includes the identification information 41 of the devices 20. The mobile terminal 50 receives the preliminary information 45. The display unit 52 of the mobile terminal 50 displays the preliminary information 45, and a worker is able to perform a task by referring thereto.

In an existing technique, a worker manually writes device information and layout information on a paper drawing. However, it is troublesome to refer to necessary information on the paper drawing. Furthermore, handwritten information is likely to cause human errors, for example, the worker misreads the information.

In the identification information input support system 100 according to the present embodiment, the preliminary information 45 appropriately processed in advance is displayed on the mobile terminal 50, and thus a worker is able to easily refer to necessary information. Displaying on the mobile terminal 50 enables the worker to easily read the information, and human errors to be reduced. Accordingly, the worker is able to efficiently perform the task of inputting the identification information 41 to the plurality of devices 20.

Furthermore, when a plurality of workers use respective mobile terminals 50, necessary information can be easily shared. As a result, the workers are able to efficiently perform tasks.

1-4-2

The storage unit 40 of the information storage apparatus 30 further stores the management information 46. The management information 46 is information indicating the degree of progress of the task of inputting the identification information 41 to the devices 20. The degree of progress indicates how much the task performed by the worker has been or has not been completed. The management information 46 is transmitted to the mobile terminal 50 and is displayed on the display unit 52.

Accordingly, the worker is able to easily grasp the degree of progress of the task.

1-4-3

The update unit 34 of the information storage apparatus updates the management information 46 in response to update of the degree of progress of the task. The updated management information 46 is transmitted from the communication unit 33 of the information storage apparatus 30 to the communication unit 51 of the mobile terminal 50. The display unit 52 of the mobile terminal 50 displays the updated management information 46.

Accordingly, the worker is able to easily grasp the updated degree of progress of the task.

(1-4-4)

The display unit 52 of the mobile terminal 50 displays the plurality of devices 20. The worker is able to select one device 20 from among the displayed plurality of devices 20. The display unit 52 displays only the piece of the device information 42 corresponding to the selected icon.

As a result of displaying only the piece of information of the selected device 20 by the display unit 52, the worker is able to easily refer to and grasp necessary information. In addition, as a result of displaying only the piece of information of the selected device 20, it is possible to reduce human errors, such as confusion between necessary information of the device 20 and information of another device 20. In other words, human errors, such as confusion with information of a neighboring device, which occur in an existing method of performing a task using information handwritten on a paper drawing, hardly occur in the identification information input support system 100 according to the present embodiment.

1-4-5

The mobile terminal 50 includes the device status transmitting unit 23. The device status transmitting unit 23 performs near field communication with the device status transmitting unit 23 of the device 20 and acquires, from the device 20, information about whether or not input of the identification information 41 has been completed. The display unit 52 of the mobile terminal 50 displays the information acquired by the device status transmitting unit 23.

The worker performs near field communication with the device 20, thereby being able to easily grasp information about whether or not a task of inputting the identification information 41 has been completed in the device 20 located within a short distance.

(1-5) Modification Examples (1-5-1) Modification Example 1

As illustrated in FIG. 2, in the identification information input support system 100, in step S106, the device 20 transmits information indicating that the task has been completed to the communication unit 33 of the information storage apparatus 30 in response to input of the identification information 41. The information indicating that the task has been completed may be manually input by the worker using the mobile terminal 50. The information indicating that the task has been completed input to the mobile terminal 50 is transmitted from the communication unit 51 of the mobile terminal 50 to the communication unit 33 of the information storage apparatus 30 through the communication link 90. In response to receipt by the communication unit 33 of the information indicating that the task has been completed, the update unit 34 updates the management information 46.

Accordingly, the worker is able to easily grasp the updated degree of progress of the task.

(1-5-2) Modification Example 2

In step S105, the worker performs the task of inputting the identification information 41 while referring the display unit 52. At this time, the worker is able to select one icon from among a plurality of icons (devices 20) displayed on the display unit 52. The display unit 52 displays the piece of the device information 42 corresponding to the selected icon such that the piece of the device information 42 corresponding to the selected icon is highlighted relative to the pieces of the device information 42 corresponding to the other icons.

As a result of displaying the piece of information of the selected device 20 by the display unit 52 such that the piece of information of the selected device 20 is highlighted relative to the pieces of information of the other devices 20, the worker is able to easily refer to and grasp necessary information.

(2) (Second Embodiment)

(2-1) Overall Configuration

Figure 5:
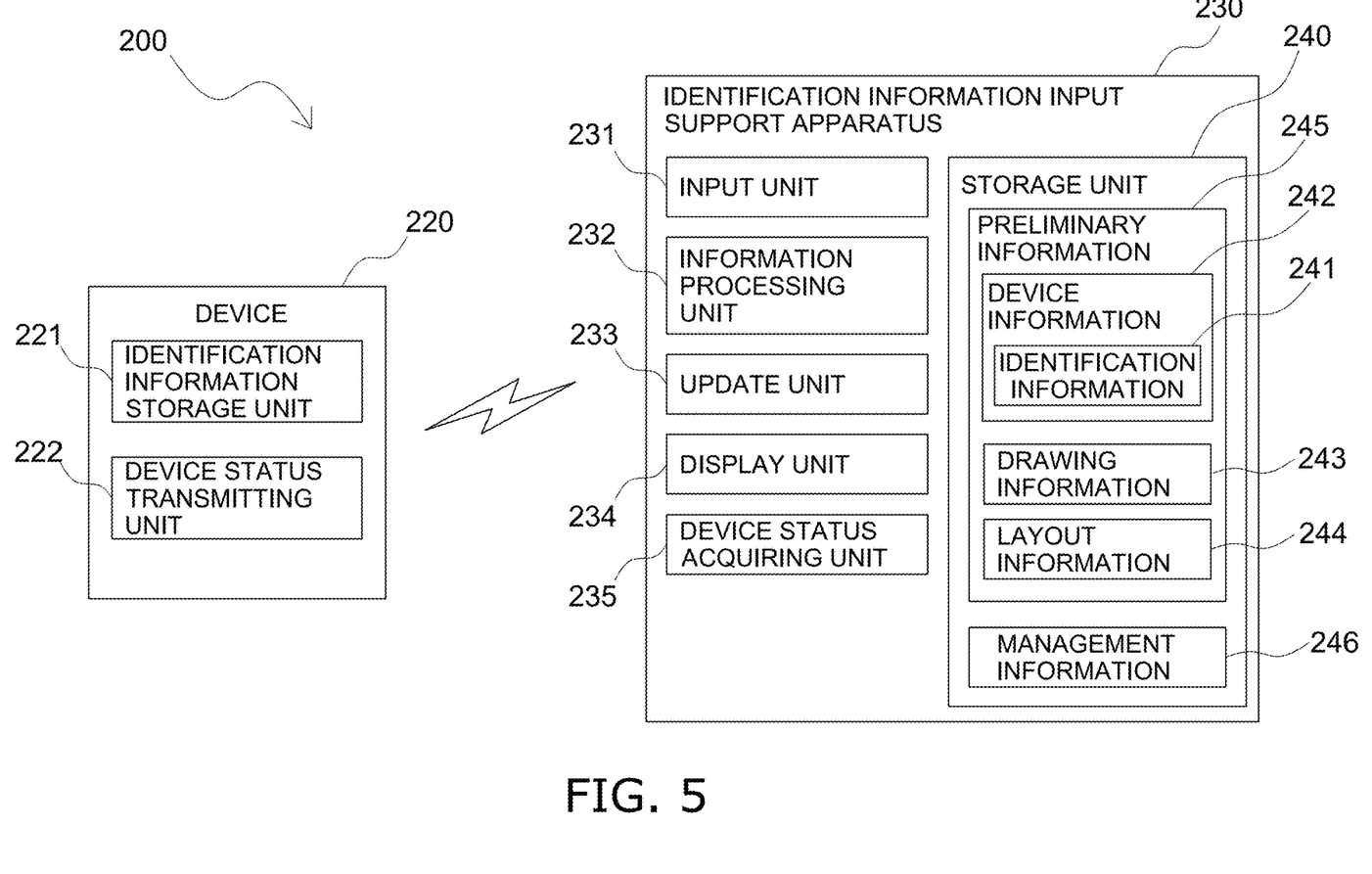
FIG. 5 is a block diagram illustrating the configuration of an identification information input support system according to a second embodiment.

FIG. 5 is a block diagram illustrating the configuration of an identification information input support system 200.

The identification information input support system 200 mainly includes a device 220 and an identification information input support apparatus 230.

(2-2) Detailed Configuration (2-2-1) Device

The device 220 is an indoor unit of an air conditioning apparatus. A plurality of the devices 220 are installed in a target space in which a worker performs a task. Each device 220 includes an identification information storage unit 221 and a device status transmitting unit 223.

The identification information storage unit 221 stores identification information 241 input by the worker.

The device status transmitting unit 223 performs near field wireless communication with the identification information input support apparatus 230, which will be described below, and transmits information indicating whether or not input of the identification information 241 has been completed. The near field wireless communication is a communication scheme that enables two-way communication within a short distance of about several centimeters to about 1 meter. As a result of performing near field wireless communication, the device status transmitting unit 223 of the device 220 is capable of acquiring, from the identification information input support apparatus 230 within a short distance, information indicating whether or not a task of inputting the identification information 241 has been completed.

(2-2-2) Identification Information Input Support Apparatus

The identification information input support apparatus 230 is, for example, a tablet PC. The worker performs a task in a target space while carrying the identification information input support apparatus 230. The identification information input support apparatus 230 includes an input unit 231, a storage unit 240, an information processing unit 232, an update unit 233, a display unit 234, and a device status acquiring unit 235.

The input unit 231 is for inputting device information 242 of the plurality of devices 220, drawing information 243, and layout information 244.

The device information 242, the drawing information 243, and the layout information 244 that have been input by the input unit 231 are processed by the information processing unit 232 and are associated with each other. Specifically, the individual devices 220 are arranged as icons at appropriate positions on the drawing. The icons are associated with the respective pieces of the device information 242 of the devices 220 corresponding to the icons. The information processed by the information processing unit 232 is regarded as preliminary information 245.

The storage unit 240 stores the preliminary information 245 and management information 246. The management information 246 is information indicating the degree of progress of the task performed by the worker. The degree of progress indicates how much the task of inputting the identification information 241 has been or has not been completed. The management information 246 is updated as appropriate by the update unit 233, which will be described below, when the task performed by the worker proceeds.

The update unit 233 updates the management information 246 stored in the storage unit 240 when the task performed by the worker proceeds.

The display unit 234 displays the preliminary information 245 and the management information 246 in association with each other.

The device status acquiring unit 235 performs near field wireless communication with the device status transmitting unit 223 of the device 220, and receives information indicating whether or not input of the identification information 241 has been completed.

(2-3) Procedure of Task

Figure 6:
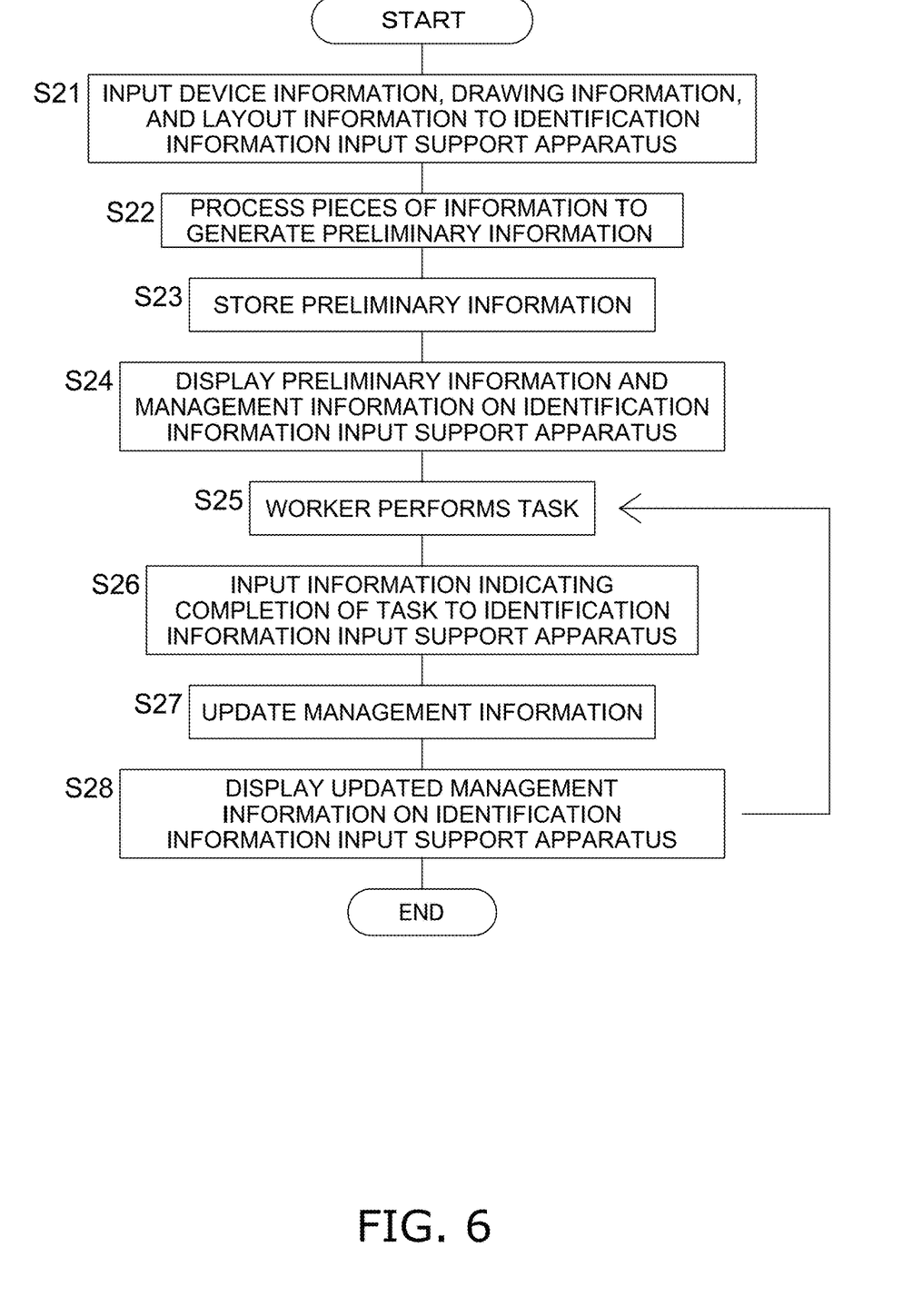
FIG. 6 is a flowchart illustrating the procedure of a task according to the second embodiment.

FIG. 6 is a flowchart illustrating the procedure of a task performed by the identification information input support system 200 and a worker. The identification information input support system 200 and the worker perform the task in accordance with the procedure including steps S21 to S in FIG. 6. The procedure of the task can be changed as appropriate.

First, in step S21, the worker inputs the device information 242, the drawing information 243, and the layout information 244 by using the input unit 231 of the identification information input support apparatus 230. The individual pieces of input information are processed by the information processing unit 232 in step S22. The processed pieces of information are associated with each other and become the preliminary information 245. In step S23, the processed preliminary information 245 is stored in the storage unit 240. In step S24, the display unit 234 displays the preliminary information 245 and the management information 246. In step S25, the worker performs a task of inputting the identification information 241 while referring the display unit 234. At this time, the worker is able to select one icon from among a plurality of icons (devices 220) displayed on the display unit 234. The display unit 234 displays only the piece of the device information 242 corresponding to the selected icon. In step S26, after completing the task, the worker inputs information indicating that the task has been completed. In step S27, the update unit 233 updates the management information 246 stored in the storage unit 240. In step S28, the display unit 234 displays the updated management information 246.

Step S105 to step S108 are repeatedly executed until the task for all the devices 220 arranged in the target space has been completed.

(2-4) Features 2-4-1

The identification information input support system 200 according to the present embodiment includes the devices 220 and the identification information input support apparatus 230. The identification information input support apparatus 230 includes the storage unit 240, and the storage unit 240 stores the preliminary information 245. The preliminary information 245 includes the device information 242, the drawing information 243, and the layout information 244 that have been processed by the information processing unit 232. The device information 242 includes the identification information 241 of the devices 220. The display unit 234 displays the preliminary information 245, and a worker is able to perform a task with reference thereto.

In the identification information input support system 200 according to the present embodiment, the preliminary information 245 processed in advance is displayed on the display unit 234, and thus the worker is able to easily refer to necessary information. Displaying on the identification information input support apparatus 230 enables the worker to easily read the information, and human errors to be reduced. Accordingly, the worker is able to efficiently perform the task of inputting the identification information 241 to the plurality of devices 220.

2-4-2

The storage unit 240 of the identification information input support apparatus 230 further stores the management information 246. The management information 246 is information indicating the degree of progress of the task of inputting the identification information 241 to the devices

220. The degree of progress indicates how much the task performed by the worker has been or has not been completed. The management information 246 is displayed on the display unit 234.

Accordingly, the worker is able to easily grasp the degree of progress of the task.

2-4-3

The update unit 233 of the identification information input support apparatus 230 updates the management information 246 in response to update of the degree of progress of the task. The display unit 234 displays the updated management information 246.

Accordingly, the worker is able to easily grasp the updated degree of progress of the task.

2-4-4

The display unit 234 of the identification information input support apparatus 230 displays the plurality of devices 220. The worker is able to select one device 220 from among the displayed plurality of devices 220. The display unit 234 displays only the piece of the device information 242 corresponding to the selected icon.

As a result of displaying only the piece of information of the selected device 220 by the display unit 234, the worker is able to easily refer to and grasp necessary information. In addition, as a result of displaying only the piece of information of the selected device 20, it is possible to reduce human errors, such as confusion between necessary information of the device 20 and information of another device 20.

2-4-5

The identification information input support apparatus 230 includes the device status acquiring unit 235. The device status acquiring unit 235 performs near field communication with the device status transmitting unit 223 of the device 220 and acquires, from the device 220, information about whether or not input of the identification information 241 has been completed. The display unit 234 of the identification information input support apparatus 230 displays the information acquired by the device status acquiring unit 235.

The worker performs near field communication with the device 220, thereby being able to easily grasp information about whether or not the task of inputting the identification information 241 to the device 220 located within a short distance has been completed.

(2-5) Modification Examples (2-5-1) Modification Example 1

In step S105, the worker performs the task of inputting the identification information 241 while referring the display unit 234. At this time, the worker is able to select one icon from among a plurality of icons (devices 220) displayed on the display unit 234. The display unit 234 displays the piece of the device information 242 corresponding to the selected icon such that the piece of the device information 242 corresponding to the selected icon is highlighted relative to the pieces of the device information 242 corresponding to the other icons.

As a result of displaying the piece of information of the selected device 220 by the display unit 234 such that the piece of information of the selected device 220 is highlighted relative to the pieces of information of the other devices 220, the worker is able to easily refer to and grasp necessary information.

(2-5-2) Modification Example 2

Input of information to the identification information input support apparatus 230 is not necessarily performed via the input unit 231. Before performing a task, a worker may connect the identification information input support apparatus 230 to another apparatus in an office or the like and may download the device information 242 of the plurality of devices 220, the drawing information 243, and the layout information 244.

The embodiments of the present disclosure have been described above. It is to be understood that the embodiments and the details can be variously changed without deviating from the gist and scope of the present disclosure described in the claims.

What is claimed is:

1. An identification information input support system that supports a worker in performing a task of inputting identification information to a plurality of devices, the identification information input support system comprising:
an information storage apparatus; and
a mobile terminal configured to communicate with the information storage apparatus,
the information storage apparatus including a processor and a storage,
the storage storing
device information including the identification information to be input to each of the plurality of devices,
drawing information indicating a location in which each of the plurality of devices is installed,
layout information indicating a layout of the plurality of devices in the drawing information, and
management information indicating a degree of progress of the task of inputting the identification information to the plurality of devices, and
the processor being programmed to communicate with the mobile terminal and update the management information in response to input of the identification information to the plurality of devices,
the mobile terminal including a processor and a display,
the mobile terminal being configured to
receive the device information, the drawing information, and the layout information from the information storage apparatus,
display the device information, the drawing information, and the layout information in association with each other,
display images representing the plurality of devices and receive a selection of one of the images by the worker,
highlight or display only a piece of the identification information that is to be input to one device among the plurality of devices which corresponds to the image selected by the worker,
perform near field communication with the one device to transmit the identification information to the one device and acquire, from the one device, information about whether or not input of the identification information has been completed, and
display the information acquired, in response to receiving information indicating that input of the identification information has been completed from the one device, the information storage device updating the management information and transmitting the management information to the mobile terminal, in response to receiving the management information that has been updated from the information storage device, the mobile terminal displaying the management information in association with the device information, the drawing information, and the layout information such that the worker can grasp the degree of progress regarding the task of inputting the identification information to the plurality of devices and the worker can perform the task with reference to display on the display, wherein the identification information of each of the plurality of devices includes a unique address usable to manage the device.

2. The identification information input support system according to claim 1, wherein the mobile terminal being one of a plurality of mobile terminals, each mobile terminal being configured to communicate with the information storage apparatus, the information storage device is configured to transmit updated management information to each of the plurality of mobile terminals after updating the management information, and each of the plurality of mobile terminals is configured to display the device information, the drawing information, the layout information, and the updated management information upon receiving the updated management information from the information storage device.

3. The identification information input support system according to claim 1, wherein the mobile terminal is configured to display the piece of the identification information that is to be input to the one device on one side of the display adjacent to a section of the display where the drawing information and the layout information are displayed.

4. The identification information input support system according to claim 3, wherein the mobile terminal is configured to display a list of the plurality of devices on the one side of the display.

5. The identification information input support system according to claim 4, wherein the mobile terminal is configured to display the list of the plurality of devices above the piece of the identification information that is to be input to the one device.

6. The identification information input support system according to claim 1, wherein each of the plurality of devices is an air conditioning device or a ventilation device.

7. The identification information input support system according to claim 6, wherein the plurality of devices is installed in a building.

8. The identification information input support system according to claim 1, further comprising the one device among the plurality of devices, the one device being configured to perform near field communication to transmit the information about whether or not input of the identification information has been completed to the mobile terminal.

9. The identification information input support system according to claim 8, wherein the one device is an air conditioning device or a ventilation device.

10. The identification information input support system according to claim 8, wherein each of the plurality of devices is an air conditioning device or a ventilation device.

11. The identification information input support system according to claim 1, further comprising the plurality of devices, each of the plurality of devices being configured to perform near field communication to transmit the information about whether or not input of the identification information has been completed to the mobile terminal.

* * * * *